United States Patent
Mathews

[11] Patent Number: 5,883,374
[45] Date of Patent: Mar. 16, 1999

[54] SCANNING SYSTEM FOR IDENTIFYING WAFERS IN SEMICONDUCTOR PROCESS TOOL CHAMBERS

[75] Inventor: Charles Ray Mathews, Austin, Tex.

[73] Assignee: Advanced Micro Devices, Inc., Sunnyvale, Calif.

[21] Appl. No.: 824,959

[22] Filed: Mar. 27, 1997

[51] Int. Cl.$^6$ ..................................................... G06K 7/10
[52] U.S. Cl. ........................................... 235/462; 235/454
[58] Field of Search .................................... 235/462, 385, 235/383, 472, 469, 454, 375

[56] References Cited

U.S. PATENT DOCUMENTS

| | | | |
|---|---|---|---|
| 5,475,892 | 12/1995 | McGuire | 15/310 |
| 5,567,927 | 10/1996 | Kahn et al. | 235/462 |
| 5,793,030 | 8/1998 | Kelly, Jr. | 235/383 |

*Primary Examiner*—Thien Minh Le
*Attorney, Agent, or Firm*—Conley, Rose & Tayon, P.C.; Eric A. Stephenson

[57] ABSTRACT

A scanning system is provided for identifying wafers contained within a semiconductor process tool chamber. The scanning system includes bar code scanner attached to a window through the process tool chamber. The bar code scanner can read a bar code displayed on a cassette of wafers while the cassette is contained within a high vacuum, particle-free environment of the process chamber. The window is provided by forming an appeture through the chamber wall. Thereafter, a window assembly, including an interface plate, a transparent member, and a retainer are attached to the load lock chamber wall, generally in alignment with the appeture formed therein. The window assembly permits the displayed bar code to be illuminated with light generated by the scanner. Additionally, the window assembly permits the bar code assembly to detect light reflected from the displayed bar code. The scanner generates a signal as a function of the reflected light which in turn is used to access a memory to identify information relating to the wafers contained within the chamber.

17 Claims, 4 Drawing Sheets

SCANNING SYSTEM FOR IDENTIFYING WAFERS IN SEMICONDUCTOR PROCESS TOOL CHAMBERS

BACKGROUND OF THE INVENTION

1. Field of the Invention

The Present invention relates generally to the art of semiconductor manufacturing and, more particularly, to an apparatus and method for identifying wafers contained inside a process tool chamber.

2. Description of the Relevant Art

Particle contamination of wafers is a serious problem in semiconductor manufacturing. During manufacturing, unprotected wafers may be exposed to airborne particles particularly when the wafers are transported from one process tool to another. Often times, these particles land on the surface of an unprotected wafer and create shorts or other performance degrading deformities in the underlying semiconductor device. Accordingly, it becomes important to avoid exposing wafers to foreign particles.

Semiconductors are manufactured in clean room environments which employ sophisticated filter systems to remove a significant amount of airborne particle contaminates. In particular, the filter systems provide a constant air flow vertically directed from ceiling to floor. Micro filters placed at the beginning of the air flow trap minute particles before they enter the clean room. The air flow ends at the clean room floor where air is recirculated back to the ceiling and filter system. Although the filters remove a significant amount of contaminates from the clean room, particles remain which may cause wafer contamination.

Semiconductor manufacturing involves a succession of processing steps whereby silicon wafers are transformed into integrated circuits. Each process step usually involves using one of several different types of process tools, including ion implanters, etchers, etc., each of which is usually contained in the clean room. Between process steps, wafers in cassettes are physically moved from one tool to another. During transfer, the wafers are tracked to ensure that they are directed to the proper process tool for subsequent processing. Prior to the present invention, cassettes of wafers were tracked using a hand-held bar code scanner (not shown). A clean room worker typically would remove a cassette from one process tool, and physically transport a cassette to a subsequent process tool for further processing. Before loading the cassette into the subsequent processing tool, the clean room worker scans a bar code displayed on a side of the cassette which contains identification information of the wafers therein in order to verify the next processing step. Often times due to simple oversight the wrong cassette is loaded into the process tool after scanning thereby resulting in wafer misprocessing. Further, movement of the hand-held bar code scanner disrupts particles resting thereon causing them to become airborne thus creating an enhanced risk that exposed wafers will be contaminated.

SUMMARY OF THE INVENTION

The problems outlined above are in large part solved by the present invention which provides a bar code scanner attached to a window of a process tool load lock chamber. In this configuration the bar code scanner can read a bar code displayed on a cassette of wafers while the cassette is positioned within a high vacuum, generally particle free environment of the load lock chamber Accordingly, the cassette and wafers contained therein can be scanned before wafer processing without subjecting the exposed wafers to the risk of particle contamination.

The window is provided by forming an aperture through the load lock chamber wall. Thereafter, a window assembly, including an interface plate, a transparent member, and a retainer are attached to the load lock chamber wall, generally in alignment with the aperture formed therein. The window assembly is also provided with a seal to maintain the vacuum state within the load lock chamber. The transparent member is formed from a material which permits transmission of light generated by the bar code scanner onto the cassette displayed bar code. Additionally, the transparent member permits transmission of light reflected from the displayed bar code onto a sensor of the externally positioned bar code scanner. The bar code scanner generates a signal as a function of the detected light. This generated signal can be turn used to be a computer system to identify the wafers contained within the load lock chamber.

One advantage of the present invention is that it reduces the risk that unprotected wafers are contaminated with foreign particles.

Another advantage of the present invention is that it ensures proper tracking of wafers thereby avoiding process tool misleading.

Yet another advantage of the present invention is that it reduces cycle time to complete fabrication of devices on seminconductor wafers by eliminating the step of scanning cassettes between process tools using a hand held scanner which in turn reduces labor needed during device fabrication.

BRIEF DESCRIPTION OF THE DRAWINGS

Other objects and advantages of the invention will become apparent upon reading the following detailed description and upon reference to the accompanying drawings in which.

Figure 1:
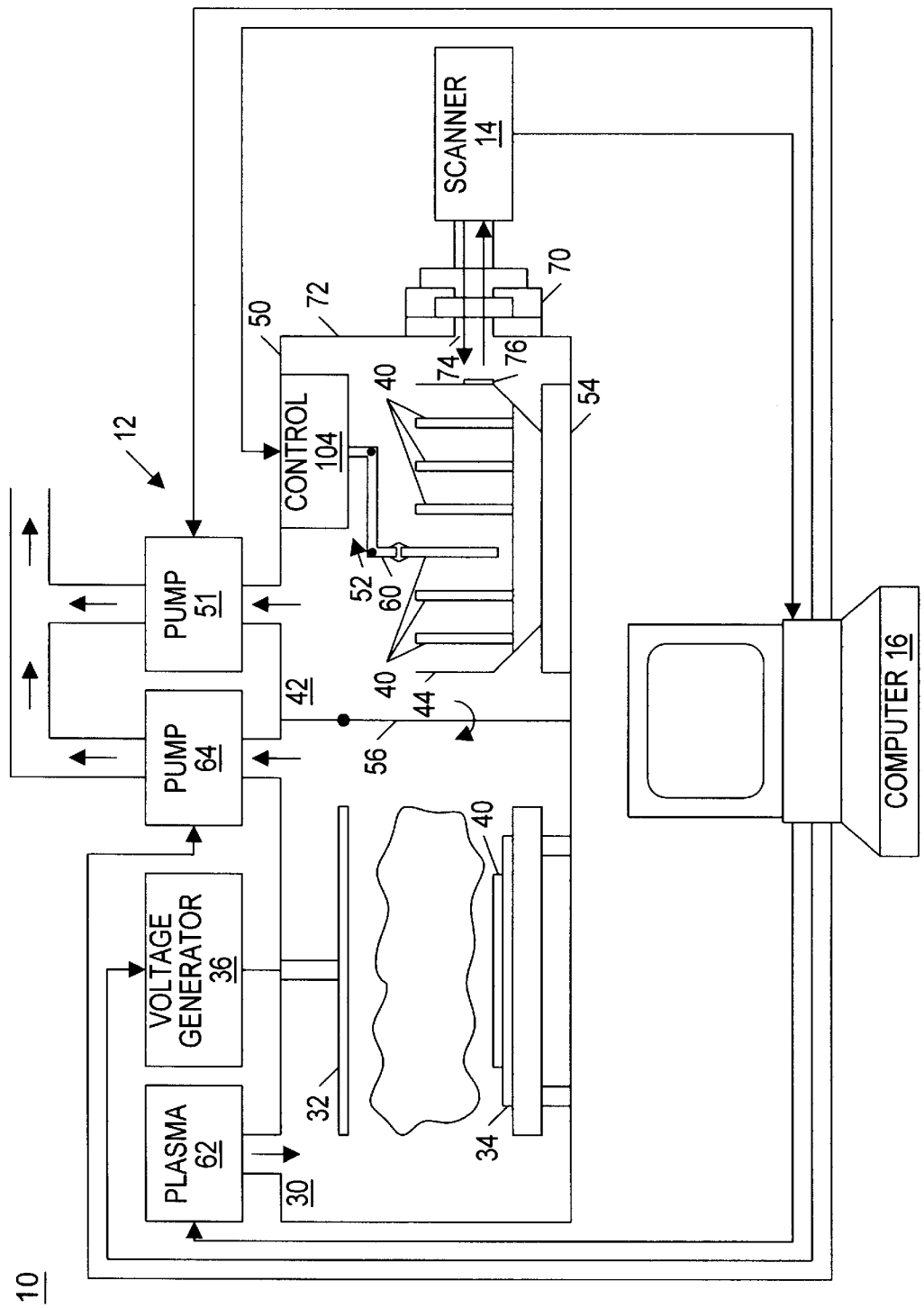
FIG. 1 shows a partial side view of a semiconductor process tool employing the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a silicon wafer processing apparatus employing the present invention. The silicon wafer processing apparatus 10 includes a process tool 12, a scanner 14, and a general purpose computer 16 connected to process tool 12 or scanner 14 or both. The present invention can be employed with any number of process tools, including ion implanters, metal deposition devices, etchers, etc. FIG. 1 describes the silicon wafer processing apparatus 10 with process tool 12 defined by a semiconductor etching device, it being understood that the present invention is employable with other types of process tools.

There are several etching techniques commonly used to etch silicon wafers, including plasma etching or a combination of plasma/reactive ion etching (RIE). Plasma and RIE techniques, often called dry etching, are relatively new and are performed in low pressure gaseous plasma. Dry etching generally involves fewer safety hazards, less spent chemical disposable problems, and also produces finer line geometric structures.

Dry etching generally requires an etching chamber capable of receiving gaseous etchant and a wafer to be etched. The etchant can be pressurized within the chamber. Operating pressure during the etching process depends upon the material being etched, the gas etchant chosen, and may range from a few torr to fractions of a militorr. After etching is completed, the gaseous material and volatile by-products can be pumped out or evacuated from the chamber.

Etching chamber 30 includes a pair of electrodes 32 and 34 at opposing sides or ends of the chamber. One electrode is charged by a controlled RF voltage supply 36, while the other electrode is grounded. Negative electron charge accumulates upon the powered electrode during one half of the RF cycle while positive ion charge accumulates during the next cycle. Since electrons are more mobile than ions, a negative potential will build upon the powered electrode and charges the electrode negative with respect to the grounded electrode and the gaseous plasma between the electrodes. Depending upon parameters set by general purpose computer 16, the voltage differential between the two electrodes may be several hundred volts.

Etching is achieved by first placing a wafer 40 on lower electrode 34. The wafer is positioned to receive positive ions directed from the plasma when the RF voltage is applied to the upper electrode 32. The ions chemically or mechanically react with the surface of the wafer 40 and cause an etching therein. After the etching process is complete, pump 64 evacuates chamber 30 to recreate a high vacuum.

Process tools, including the etching device 12 shown in FIG. 1, generally include a load lock chamber 42 configured to receive a cassette 44 containing several wafers 40 to be processed. Load lock chamber 42 provides a contamination free or reduced particle environment where wafers can be held before and after they are etched. The load lock chamber precludes exposure of the etching chamber 30 to the particle contaminated clean room in which the etching device is contained. Load lock chamber 42 is generally defined by an opaque wall 50 and includes a pump 51, a robot 52, a cassette support 54 and a scanner mounting assembly or window assembly 70 according to the present invention which will be more fully described below.

Load lock chambers act as a staging area for etching wafers. After the cassette 44 of wafers 40 is placed into load lock chamber 42 and an access door (not shown) is closed, pump 50 operates to create a high level, particle free vacuum. Ideally, this vacuum should equal the vacuum previously established in etching chamber 30 by pump 64. Once the atmospheres in etching chamber 30 and load lock chamber 42 equalize, door 56 opens thereby providing access between the two chambers. Robot arm 60 selects a wafer 40 from cassette 44, passes the selected wafer through the opening between the chambers, and places the selected wafer on lower electrode 34. Thereafter, robot arm 60 retreats back into load lock chamber 42, door 56 closes thereby isolating etch chamber 30 from load lock chamber 42.

General purpose computer 16 controls plasma source 62, voltage generator 36, etch chamber pump 64 and load lock pump 50. With the wafer 40 properly positioned on lower electrode 34, general purpose computer 16 directs plasma source 62 to provide an etching plasma within chamber 30. General purpose computer 16, acting in connection with plasma source 62, sets process parameters such as plasma density, temperature, etc., in accordance with predefined instructions which could be stored within a memory of the computer. Wafer 40 may be subjected to an etch process with parameters set to any of a variety of predefined values. It becomes important that each particular wafer 40 be subjected to the appropriate etch technique. If somehow wafer 40 is subjected to the wrong etching technique, wafer 40 will be ruined.

After wafer 40 has been properly etched, general purpose computer 16 directs pump 64 to evacuate all etching by-products from chamber 30, and return chamber 30 to a high vacuum state which equals the vacuum in load lock chamber 42. Door 56 then opens allowing robot arm 60 to retrieve wafer 40 from etch chamber 30. After the etched wafer is returned to the cassette robot arm 60 selects a subsequent wafer 40 for etching in chamber 30.

Figure 2:
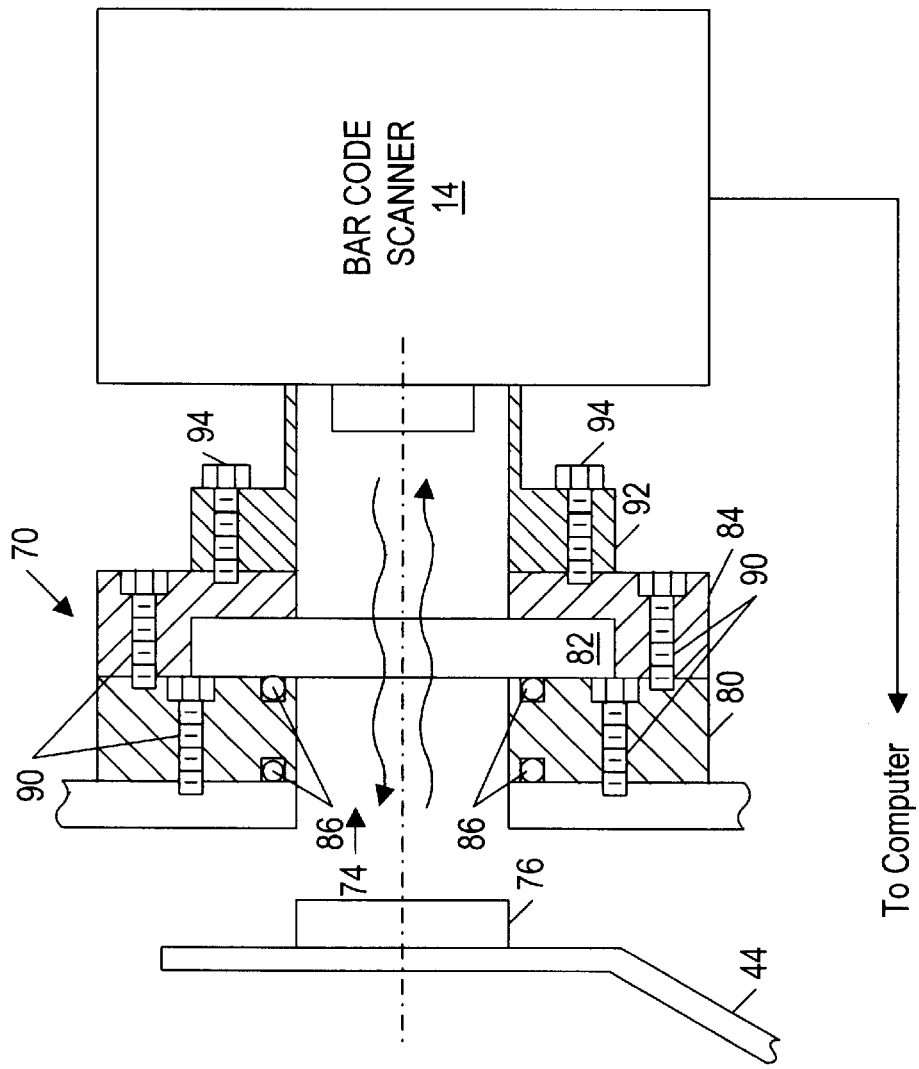
FIG. 2 is a cross-sectional view of the chamber wall and window assembly according to one embodiment of the present invention.
Figure 4:
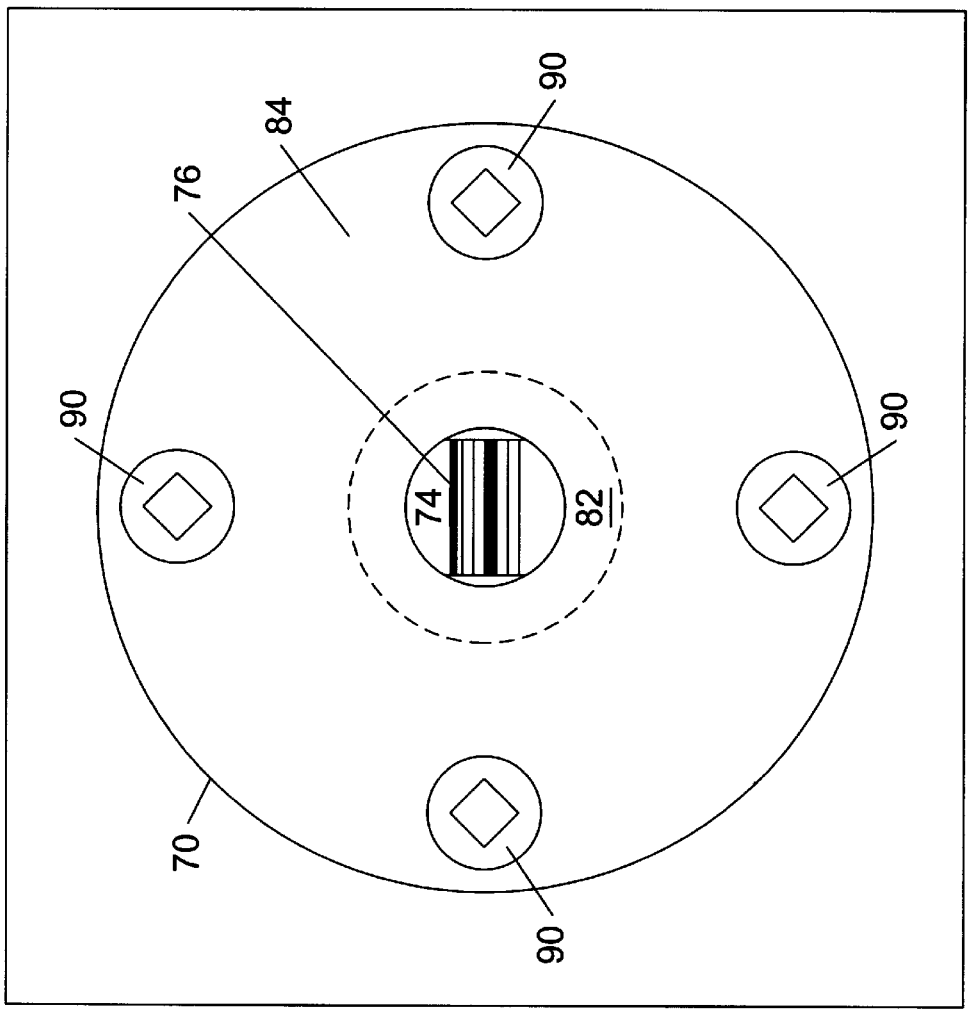
FIG. 4 is a side view of the semiconductor process tool wall showing the window assembly of the present invention and a cassette bar code display aligned thereto.

Scanner 14 is preferably a bar code scanner. Scanner 14 can be connected to general computer 16, which stores information related to the wafers, which information can be accessed by the information contained in bar codes on the cassette 44. Moreover, scanner 14 can be directly connected to load lock chamber via mounting assembly or window assembly 70 as shown in FIG. 2. The window assembly 70 can be attached to an external surface 72 of load lock chamber 50. Moreover, window assembly 70 is positioned in alignment with opening 74 through chamber wall 50 in such a way that scanner 14 may read aligned bar code 76 displayed on a side of wafer cassette 44 received in load lock chamber 42. FIG. 4 shows bar code 76 displayed upon cassette 44 while looking through window assembly 70. It is understood that window assembly 70 need not be applied externally to the chamber wall 50. Rather, window assembly 70 may be attached to an internal surface of chamber wall 50. It is, however, important that opening 74 formed through chamber wall 50 be sealed with window assembly 70 to maintain a high vacuum particle reduced environment within load lock chamber 42.

Figure 3:
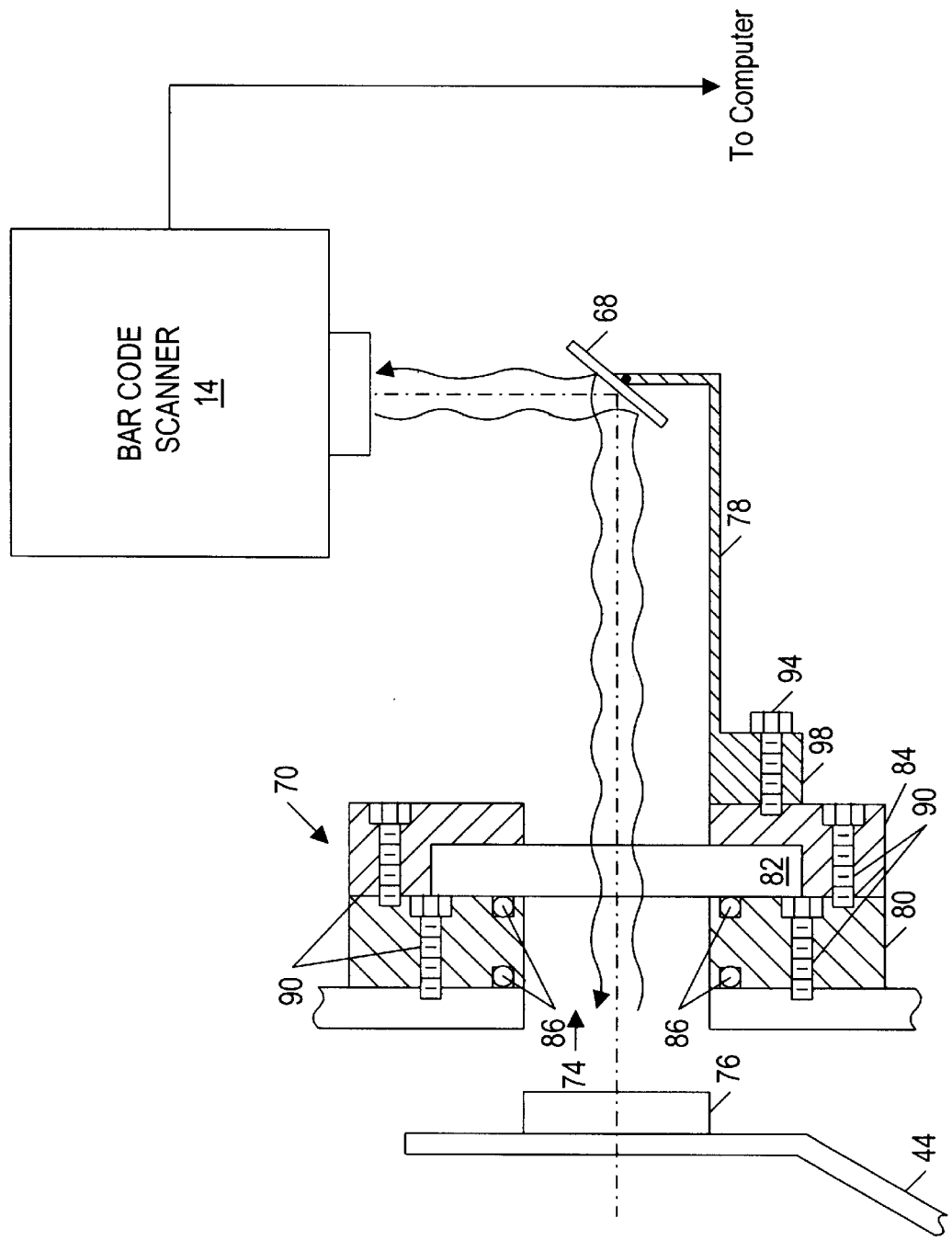
FIG. 3 is a cross-sectional view of the chamber wall and window assembly according to an alternative embodiment of the present invention.

In the alternative, as shown in FIG. 3, an adjustable mirror 68 may be mounted to assembly 70 with scanner 14 positioned remotely therefrom. The mirror 68 is pivotally mounted to an arm 78 extending from assembly 70. In this configuration, light emitted from remotely positioned scanner, is redirected by mirror 68 through opening 74, and light reflected from bar code is redirected by mirror 68 to scanner 14. This configuration facilitates avoidance of space limitations on mounting scanner 14 to assembly 70.

With continuing reference to FIG. 1 and with further reference to FIGS. 2 and 3, window assembly 70 will now be more fully explained. Window assembly 70 includes an interface plate 80, a transparent member 82, a retaining member 84, fluid seals such as o-rings 86, and fasteners such as bolts 90. Transparent member 82 is formed from a suitable light transparent material having sufficient strength to withstand forces applied thereto when load lock chamber is subjected to a high vacuum. One suitable material may be plexiglass. Thickness of transparent member 82 can be selected in accordance with well known design techniques in order to accommodate proper scanning of bar code 76 by bar code scanner 14.

Interface plate 80 and retaining member 84 are formed from a sufficiently rigid material such as stainless steel. The interface plate 80 and retaining member 84 each have an aperture formed therethrough, each aperture being and in alignment with opening 74. Retaining member 84 is provided to maintain light transparent member 82 in a secure position such as shown.

O-rings 86 are provided in channels formed within interface plate. O-rings 86 establish a seal between chamber wall 50 and interface plate 80, and between interface plate 80 and light transparent member 82. The o-rings 86 prevent any fluid passage into and out of load lock chamber 42.

As shown in FIG. 2, bar code scanner 14 includes an adaptive member 92 mounted to window assembly 70 using fasteners such as bolts 94. As shown in FIG. 3, arm 78 includes an adaptive member 98 mounted to window assembly 70 using fasteners such as bolts 94.

Bar code scanner 14 includes a light generation device 100 and a light sensor 102. In operation light generator 100 generates a light which passes through both the window assembly 70 and chamber wall opening 74, and illuminates bar code 76 displayed on cassette 44. Light reflected from bar code 76 passes in an opposite direction through chamber wall opening 74 and light transparent member 82 where it is sensed by light sensor 102. Bar code scanner 14 generates a signal indicative of light sensed by sensor 102. This signal is transmitted to general purpose computer 16. The signal transmitted by the scanner can be used to access memory in computer 16 which may contain relevant data concerning the wafers contained within cassette 44 on which bar code 76 is displayed.

For example, the internal memory may contain etching parameter instructions such as etchant pressure, temperature, etc., associated with wafers 40 contained withint load lock chamber 42. The instructions can be transmitted to plasma source 62, voltage generator 36, pump 64, pump 50, and robot interface control 104.

Since scanner 14 reads bar code 76 while cassette 44 is contained within a high vacuum atmosphere in load lock chamber 42, wafers 40 are protected against particle contamination resulting from vertical air disruptions caused by bar code scanner motion or other clean room tool motion. Moreover, since computer 16 is provided with information identifying wafers 40 contained within load lock chamber 42, there is a reduced risk that wafers 40 will be subjected to an erroneous etching technique.

It will be appreciated to those skilled in the art having the benefit of this disclosure that this invention is believed to be capable of being applied with numerous types of semiconductor processing tools. Various modifications and changes may be made without departing from the spirit and scope of the invention as set forth in the claims.

It is intended that the following claims be interpreted to embrace all such modifications and changes to the foregoing invention description.

What is claimed is:

1. A silicon wafer processing apparatus, comprising:

a first chamber for processing step to a silicon wafer;

a second chamber operatively connected to the first chamber, wherein the second chamber is defined by an opaque wall, said second chamber being configured to receive a cassette of wafers to be processed in the first chamber, wherein the received cassette includes a displayed code thereon;

a code reader positioned external to the second chamber for reading the displayed code and generating signals indicative thereof, the scanner having a light source and light sensor;

a first light passage defined by an aperture formed through the wall of the second chamber, wherein the first light passage is and in alignment with the displayed code;

a mounting assembly mounted to the wall of the second chamber, the mounting assembly having a second light passage in alignment with the first light passage, whereby light, generated by the code reader light source, passes through the first and second passages and illuminates the displayed code on the cassette received inside the second chamber, and light, reflected from the displayed code on the cassette received inside the second chamber, passes through the first and second passages and is sensed by the scanner light sensor.

2. The silicon wafer processing apparatus of claim 1 further comprising a general purpose computer in data communication with the code reader, said general purpose computer having a memory containing data relating to the wafers to be processed by the apparatus, wherein the memory is addressable by the signal generated by the code reader.

3. The apparatus of claim 1 wherein the mounting assembly comprises:

an interface plate having an aperture extending therethrough;

a light transparent member engaging the interface plate, and;

a retaining member for retaining the transparent member in engagement with the interface plate, said retaining member having an aperture extending therethhrough and in alignment with the aperture of the interface plate.

4. The apparatus of claim 2 wherein the mounting assembly further comprises a first o-ring positioned between the interface plate and the second chamber wall, and a second o-ring positioned between the transparent member and the interface plate, wherein the first and second o-ring prevent fluid flow through the apertrure formed through the wall of the second chamber.

5. The apparatus of claim 3 further comprising a mirror assembly mounted to the retaining member, for redirecting light generated by the scanner and for redirecting light reflected by the displayed code.

6. The apparatus of claim 3 wherein the retaining member includes an outer face engaging the code reader so that the code reader light source and light sensor are in alignment with the first and second light passages.

7. The apparatus of claim 1 wherein the readable code is defined by a bar code, and the code reader is defined by a bar code scanner.

8. The apparatus of claim 1 wherein the readable code displayed information relating to wafers contained in the wafer cassette.

9. An apparatus for identifying wafers contained in a chamber of a wafer processing device, the apparatus comprising:

a scanner positioned external to the chamber for reading codes and generating signals indicative thereof, the scanner having a light source and a light sensor;

an opening through an opaque wall of the chamber, the opening being aligned with a code displayed on a cassette received inside the chamber wherein light, generated by the scanner light source, passes through the opening and illuminates the displayed code, and light, reflected from the displayed code, passes through opening and is sensed by the scanner light sensor, wherein in response to sensing the reflected light, the scanner generates a signal relating to wafers contained in the cassette.

10. The apparatus of claim 8 further comprising a window assembly attached to a chamber wall surface, the window assembly comprising a light transparent member which transmits (1) the light generated by the scanner light source, and (2) the light reflected from the code displayed on the cassette.

11. The apparatus of claim 10 wherein the window assembly is attached to an external surface of the chamber, and further comprises;

an interface plate having an aperture extending therethrough, an outer face engaging the light transparent member, and an inner face engagaing the external surface of the chamber, and;

a retaining member for retaining the transparent member in engagement with the interface plate, said retaining member having an aperture extending therethhrough and in alignment with the aperture of the interface plate.

12. The apparatus of claim 9 further comprising a general purpose computer in data communication with the scanner, wherein the general purpose computer includes a memory for storing process control signals for controlling the wafer processing device, the process control signals being indexable by the signal generated by the scanner.

13. The apparatus of claim 10 wherein the window assembly seals the chamber wall opening to prevent fluid form passing therethrough.

14. The apparatus of claim 9 wherein the scanner is defined by a bar code scanner, and the displayed code on the cassette is defined by a bar code.

15. The apparatus of claim 4 further comprising a mirror assembly mounted to the retaining member for redirecting light generated by the scanner and for redirecting light reflected from the displayed code.

16. A method comprising the steps:

placing a cassette of wafers inside a chamber of a semiconductor processing device, wherein the cassette displays a bar code identifying the wafers in the cassette;

illuminating the cassette bar code, wherein the cassette bar bode is aligned with an opening in an opaque wall of the chamber;

detecting light reflected from the cassette bar code;

generating a signal as a function of the detected light;

setting processing parameters of the semiconductor processing tool in accordance with the generated signal.

17. The method of claim 16 further comprising the step of creating a vacuum in the chamber after placement of the cassette in the chamber.

* * * * *